April 14, 1936.     F. A. HOLBY     2,037,022
TANK TRUCK
Original Filed April 3, 1933     2 Sheets-Sheet 1
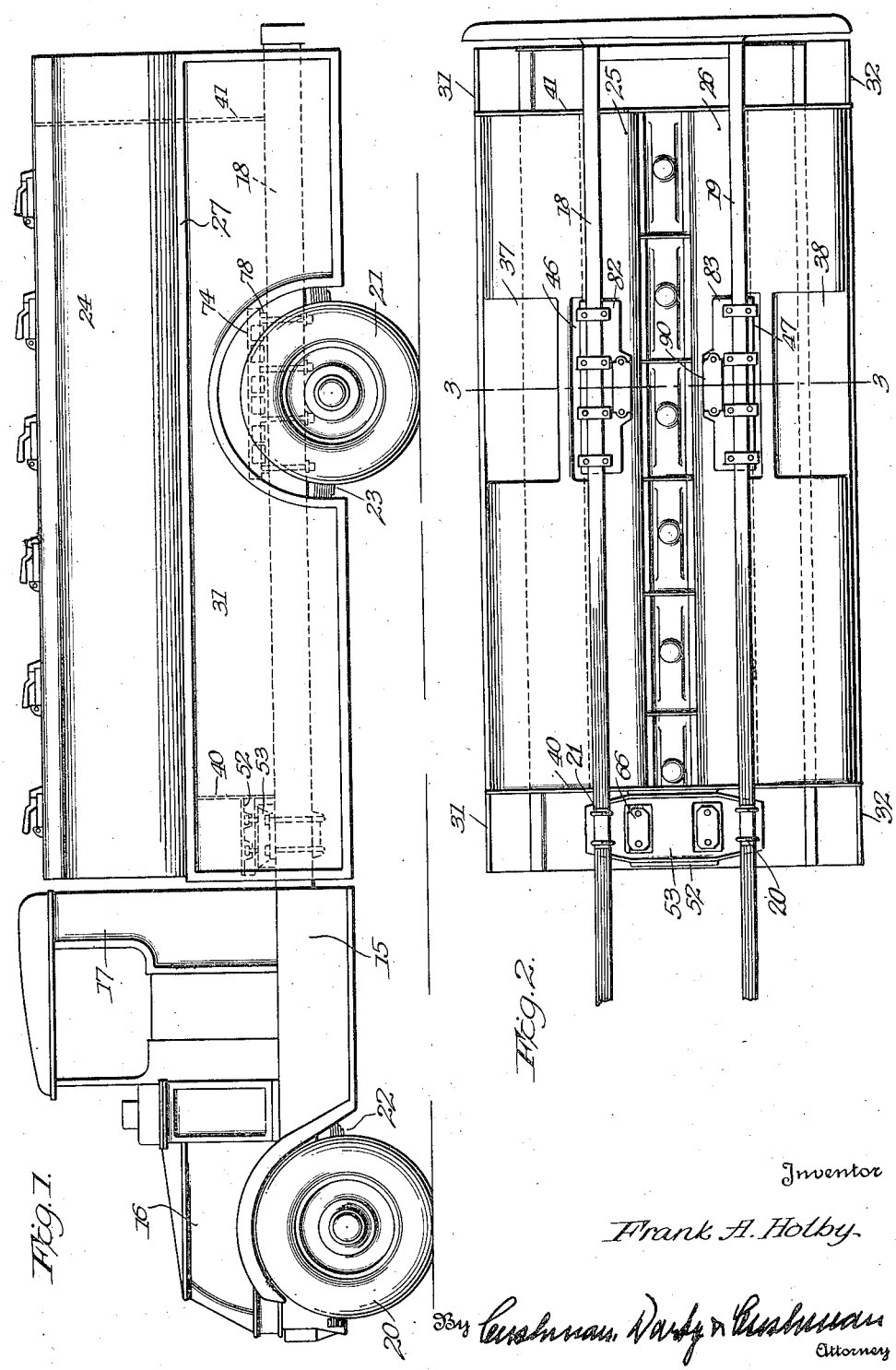
Inventor
Frank A. Holby
By Cushman, Darby & Cushman
Attorney

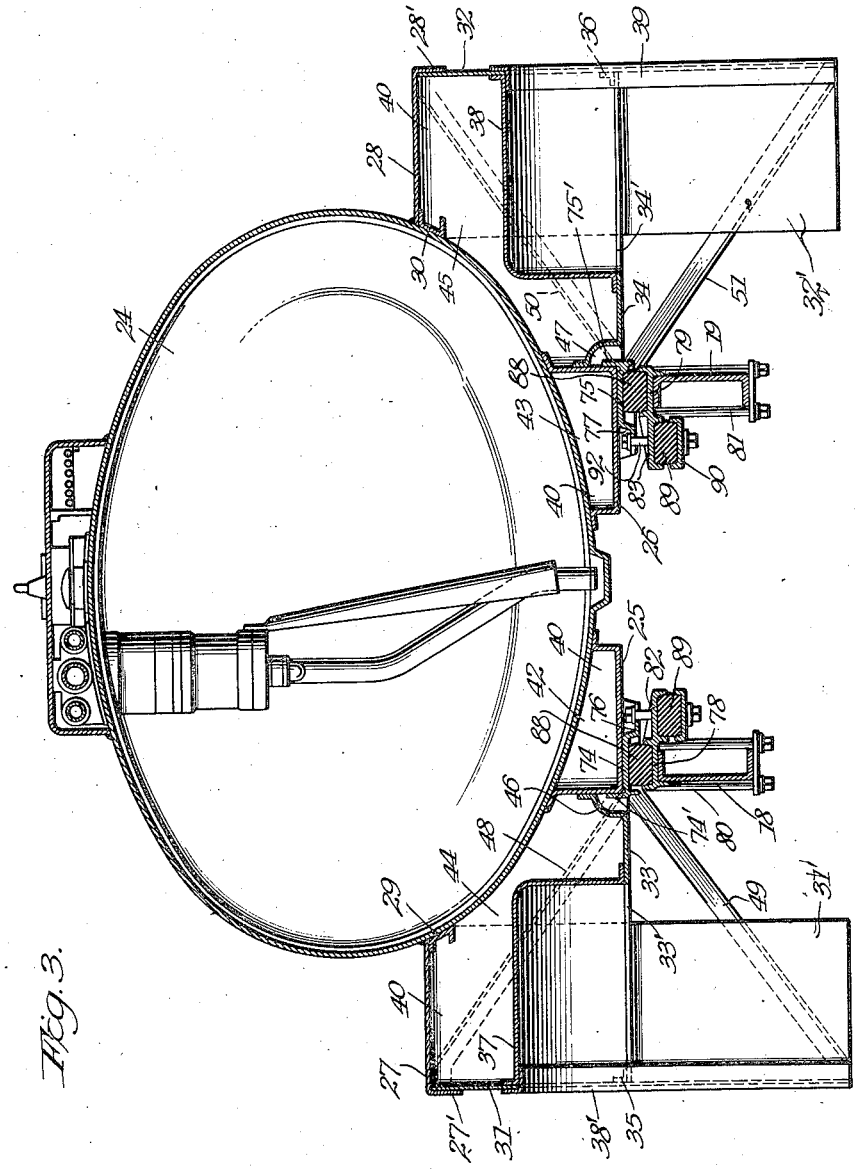

Patented Apr. 14, 1936

2,037,022

UNITED STATES PATENT OFFICE 2,037,022

TANK TRUCK

Frank A. Holby, New York, N. Y., assignor, by mesne assignments, to The William F. Kenny Company, New York, N. Y., a corporation of New York Original application April 3, 1933, Serial No. 664,255. Divided and this application August 5, 1933, Serial No. 683,888. Renewed December 2, 1935

3 Claims. (Cl. 280—5)

The present invention relates to tank truck construction wherein auxiliary tanks are provided in conjunction with the main tank, a plurality, preferably, of the auxiliary tanks being disposed beneath the main tank as supporting means for the latter. The construction preferably includes a cushion supporting system and means for the main tank preferably interposed at least in part between the above mentioned bottom auxiliary tanks and the truck chassis, these latter features being particularly covered in my copending United States application Serial No. 719,568, filed April 7, 1934.

This application is a division of my original application Serial No. 664,255, filed April 3, 1933.

A practical embodiment of the invention is shown by way of example in the accompanying drawings, in which:

Figure 1 is a side elevation of a tank truck constructed in accordance with the invention, Figure 2 is a bottom plan view of the truck frame and tank, and Figure 3 is a section substantially on the line 3—3 of Figure 2.

Referring to the drawings, reference numeral 15 designates generally a truck chassis which may be of any preferred design. As here shown, the chassis has an engine compartment 16 at its front end and behind this a cab 17. The chassis frame comprises essentially a pair of longitudinal members such as channel members 18 and 19, Figures 1, 2 and 3, the frame being supported on front and rear pairs of wheels as at 20 and 21 through the intermediary of springs as at 22 and 23. A main tank 24 of substantially the elliptical cross section shown in Figure 3, extends longitudinally of the frame to the rear of the cab 17. The tank is here shown extending a considerable distance rearwardly of the rear wheels as well as forwardly thereof.

A pair of trough-like members 25 and 26, Figures 2 and 3, are disposed beneath main tank 24 and have outwardly flanged side walls welded or otherwise suitably secured against the bottom wall of the tank. The side walls of members 25 and 26 are preferably of such height that their bottom walls are substantially horizontal and the members extend in parallel relation directly above longitudinal frame members 18 and 19.

Plates or strips 27 and 28 extend along the sides of the main tank in laterally projecting relation, these plates being of relatively heavy metal to serve as runways and having their inner edges welded to the sides of the main tank and also secured thereto through flange members such as shown at 29 and 30, Figure 3. The outer edges of plates 27 and 28 are turned downwardly to provide vertical flanges 27' and 28'. Vertical sheets 31 and 32 have their upper margins welded against flanges 27' and 28' and substantially horizontal sheets 33 and 34 extend from the vertical sheets 31 to and somewhat beneath members 25 and 26 respectively, to be welded thereagainst. The outer edges of sheets 33 and 34 may be welded to sheets 31 and 32 through the intermediary of angle strips 35 and 36. Immediately above the rear wheels, plates 33 and 34 are provided with cut-outs 33' and 34', as shown in Figure 3, and the vertical plates 31 and 32 are arcuately recessed. Wheel hoods 37 and 38 are set in the openings thus formed and have flanged edges welded to the vertical and horizontal sheets, respectively. The arcuate cut-outs in the vertical plates 31 and 32 are preferably rimmed by angle members 38' and 39.

Sheets 31 and 32 preferably extend throughout the length of the main tank as shown in Figures 1 and 2. As here contemplated, however, members 25 and 26 terminate short of the ends of the main tank and plates 33 and 34 are of the same length as elements 25 and 26. End closure plates 40 and 41 close the ends of members 25 and 26 and also extend outwardly to plates 31 and 32 to close the ends of the spaces defined by plate 27, sheets 31 and 33, and plate 28 and sheets 32 and 34 respectively.

In this manner four auxiliary tanks are provided and are designated generally by the reference characters 42, 43, 44 and 45, respectively, the main tank wall constituting wall portions of all of these auxiliary tanks and the outer walls of tanks 42 and 43 constituting inner wall portions of tanks 44 and 45. While plates 33 and 34 have their inner marginal portions for the most part secured beneath the bottom walls of tanks 42 and 43, as above mentioned, in the vinicity of the rear walls these marginal portions are bent upwardly and inwardly and secured to the outside walls of tanks 42 and 43 to form pockets 46 and 47, Figures 2 and 3. Note that plates 33 and 34 have a horizontal portion, Figure 3, between wheel hoods 37 and 38 and pockets 46 and 47 so that fluid at either side of the wheel hoods has access to the other side. Inlet and discharge openings for the auxiliary tanks may be positioned as desired. The outlet openings will preferably be at the rear ends of the tanks and provided with faucets.

Plates 31 and 32 are extended as aprons below horizontal plates 33 and 34 and forwardly and rearwardly of plates 33 and 34 may be braced by suitable members as at 48, 49, 50 and 51. End aprons as at 31' and 32' may be provided.

Immediately forward of tanks 42 and 43 a cradle member 52 is secured to the bottom of the main tank 26 and beneath this cradle member a bolster 53 extends across longitudinal frame members 18 and 19 and is secured thereto by means of U-bolts 20 and 21. Compressible blocks are interposed between the cradle and bolster so that the front end of the tank structure is resiliently supported on the bolster as more fully described in my copending application, Serial No. 719,568, above mentioned.

Brackets 74 and 75 are secured to the lower surface of members 25 and 26, these brackets extending as here shown, Figures 1 and 2, a substantially equal distance fore and aft of the axis of the rear wheels. These brackets have upright flanges 74' and 75' seated against the lower marginal portion of the outer walls of members 25 and 26 and received in pockets 46 and 47. The brackets also have inwardly extending downwardly offset portions as at 76 and 77 for the reception of tie bolt heads and washers. Lower brackets 78 and 79 extend immediately beneath the upper brackets and are secured on top of the longitudinal frame members 18 and 19 by means of U bolts 80 and 81. Brackets 78 and 79 have inward extensions 82 and 83. Compressible blocks 88 are interposed between brackets 74 and 78 and 75 and 79, respectively. Rebound blocks 89 are positioned below extensions 82 and 83 with their lower portions engaged in stirrup plates as at 90, which latter are engaged by tie bolts as at 92 whose upper ends engage the offset portions 76 and 77. This arrangement is more specifically described in my said application, Serial No. 719,568.

From the above it will be seen that I have provided a tank truck of considerable capacity, additional capacity being provided by auxiliary tanks built in conjunction with the main tank and serving to rigidify the latter to a considerable extent. Also, I have provided a novel arrangement and form of cushion means affording a substantially three-point mounting so that torsional strains on the tank are substantially eliminated. The rear cushioning means are preferably interposed between the truck frame and the bottom auxiliary tanks 42 and 43 which latter thus act as weight transmitting members between the main tank and chassis members and serve to distribute stresses to the main tank.

It will be understood that various changes are possible in the described construction and arrangement without departure from the scope of the invention. Consequently, I do not limit myself in these respects except as in the following claims.

I claim:

1. In a tank truck, a main tank extending longitudinally of the truck, an auxiliary tank extending along the lower side of said main tank, and a wheel hood set in the bottom of and within said auxiliary tank between the ends of the latter, said wheel hood being of less width than said bottom so as to permit free flow between the end portions of the auxiliary tank.

2. A tank truck comprising a chassis, the chassis comprising at least one longitudinal member, a tank extending longitudinally of the chassis above said member, a channel unit extending horizontally between the tank and said longitudinal member, said channel unit having side walls with top edges secured in continuous connection with the tank wall and a bottom wall having support on said longitudinal member, said channel unit constituting weight transmitting means between said tank and said longitudinal member, and means closing the ends of the cavity defined by said channel unit in conjunction with the tank wall whereby to provide an auxiliary tank.

3. A tank truck comprising a chassis, the chassis comprising longitudinal members disposed in laterally spaced relation, a tank extending longitudinally of the chassis above said members, channel units extending substantially throughout the length of the tank between the tank and said longitudinal members respectively, each of said channel units having side walls with top edges secured in continuous connection with the tank and a bottom wall having support on one of said longitudinal members, said channel units constituting weight transmitting means between said tank and longitudinal members, and means closing the ends of the cavities defined by said channel units in conjunction with the tank wall whereby to provide auxiliary tanks.

FRANK A. HOLBY.